(12) United States Patent
Lee (10) Patent No.: US 8,073,771 B2
(45) Date of Patent: Dec. 6, 2011

(54) METHOD AND SYSTEM FOR PAYER-CENTRIC PAYMENT USING MOBILE TERMINAL

(76) Inventor: Wang Seok Lee, Seoul (KR)

( * ) Notice: Subject to any disclaimer, the term of this patent is extended or adjusted under 35 U.S.C. 154(b) by 534 days.

(21) Appl. No.: 12/350,199

(22) Filed: Jan. 7, 2009

(65) Prior Publication Data

US 2009/0182633 A1   Jul. 16, 2009

(30) Foreign Application Priority Data

Jan. 11, 2008   (KR) .................. 10-2008-0003572

(51) Int. Cl.
*G06Q 40/00*   (2006.01)
(52) U.S. Cl. ............................................. 705/39
(58) Field of Classification Search .......... 705/35, 705/39
See application file for complete search history.

(56) References Cited

U.S. PATENT DOCUMENTS

| | | | | |
|---|---|---|---|---|
| 2002/0077974 A1* | 6/2002 | Ortiz | ............................ | 705/39 |
| 2007/0124211 A1* | 5/2007 | Smith | ............................ | 705/21 |
| 2007/0156436 A1* | 7/2007 | Fisher et al. | ............................ | 705/1 |
| 2008/0275771 A1* | 11/2008 | Levine | ............................ | 705/14 |
| 2009/0144161 A1* | 6/2009 | Fisher | ............................ | 705/16 |

FOREIGN PATENT DOCUMENTS

| | | |
|---|---|---|
| KR | 2004-85552 | 10/2004 |
| KR | 2005-048992 | 5/2005 |
| KR | 2006-86793 | 1/2006 |
| KR | 2007-104873 | 10/2007 |

* cited by examiner

*Primary Examiner* — Lindsay M Maguire
*Assistant Examiner* — Eric T Wong
(74) *Attorney, Agent, or Firm* — Ladas & Parry LLP (57) ABSTRACT

Provided are a method and system for payer-centric payment using a mobile terminal through which payment is made while information about a payer is not released to a participating store. Specifically, a terminal of the participating store transmits payment information including a payment amount and participating store identification information to an auxiliary terminal, the auxiliary terminal transmits the payment information to the mobile terminal of the payer, the mobile terminal of the payer transmits the payment information and information about a payment means to pay the payment amount to a payment processing system, and finally, the payment processing system pays the payment amount by using the payment means and then transmits information about a result of payment processing to the mobile terminal of the payer and the terminal of the participating store.

14 Claims, 8 Drawing Sheets

METHOD AND SYSTEM FOR PAYER-CENTRIC PAYMENT USING MOBILE TERMINAL

CROSS-REFERENCE TO RELATED PATENT APPLICATION

This application claims the benefit of Korean Patent Application No. 10-2008-0003572, filed on Jan. 11, 2008, in the Korean Intellectual Property Office, the disclosure of which is incorporated herein in its entirety by reference.

BACKGROUND OF THE INVENTION

1. Field of the Invention

The present invention relates to a method and system for payer-centric payment using a mobile terminal, and more particularly, to a method and system for payer-centric payment using a mobile terminal through which information is exchanged and payment is made by using local area wireless communication between an auxiliary terminal connected to a terminal of a participating store through wireless communication and a mobile terminal of a payer so that personal information about the payer is not released to a participating store and simultaneously the payer can make payment by himself/herself without temporal and spatial limitations.

2. Description of the Related Art

In recent times, problems such as the release of personal information and credit card skimming when a payer makes payment for a product or service purchased online, have emerged as serious social problems.

In related offline payment methods, a payer generally presents a credit card to a participating store, credit card information is read by a credit card reader at the participating store, and then, a payment amount is input and payment is made. Thereafter the credit card is returned to the payer.

In this case, payment is substantially made by allowing the participating store to use the credit card so that credit card information is inevitably released to the participating store. Due to inherent problems of the related offline payment methods, the payer is constantly at risk of credit card skimming or release of personal information.

In particular, due to the release of personal information, fraudulent use of a citizen registration number or sending of indiscreet, illegal or obscene spam e-mails or spam text messages has been known to happen, which can lead to serious social problems. In addition, by inappropriate use of the personal information, people are receiving to their home or mobile phone one two or even several telesales calls per day, and these kinds of complaints of mobile phone or telephone subscribers are increasing.

SUMMARY OF THE INVENTION

The present invention provides a method and system for payer-centric payment using a mobile terminal through which payment is made while information about a payer is not provided to a participating store.

According to an aspect of the present invention, there is provided a system for payer-centric payment using a mobile terminal, the system including: a terminal of a participating store installed at the participating store; an auxiliary terminal that is mobile and is connected to the terminal of the participating store by using wireless communication; a mobile terminal of a payer connected to the auxiliary terminal by using local area wireless communication; and a payment processing system making payment for a product or service purchased by the payer at the participating store, wherein the terminal of the participating store receives advertising data from the payment processing system, when receiving a payment request signal that is requested to start a payment procedure from the auxiliary terminal, extracts payment information from an order detail that is stored in advance for the product or service purchased by the payer and transmits the advertising data and the payment information to the auxiliary terminal that transmits the payment request signal, and when receiving, from the payment processing system, information about a result of payment processing that indicates whether payment for the product or service purchased by the payer is finally processed, outputs the information about the result of payment processing, the auxiliary terminal transmits the payment request signal to the terminal of the participating store and transmits the payment information and the advertising data that are received from the terminal of the participating store to the mobile terminal of the payer by using local area wireless communication, the mobile terminal of the payer transmits information about a payment means to the payment processing system together with the payment information received from the auxiliary terminal, outputs the advertising data from the auxiliary terminal, and when receiving, from the payment processing system, the information about the result of payment processing that indicates whether payment for the product or service purchased by the payer is finally processed, outputs the information about the result of payment processing, the payment processing system transmits the advertisement data to the terminal of the participating store, finally makes payment for the product or service purchased by the payer based on the payment information and the information about the payment means received from the mobile terminal of the payer and then transmits the information about the result of payment processing to the mobile terminal of the payer and the terminal of the participating store, the payment information comprises a payment amount for the product or service purchased by the payer and participating store identification information of the participating store, the advertising data is data associated with a location of the participating store or the product or service handled at the participating store, and personal information about the payer is not revealed to the participating store.

According to another aspect of the present invention, there is provided a method of payer-centric payment using a mobile terminal by using a payer-centric system comprising a terminal of a participating store installed at the participating store, an auxiliary terminal that is mobile and is connected to the terminal of the participating store by using wireless communication, a mobile terminal of a payer connected to the auxiliary terminal by using local area wireless communication, and a payment processing system making payment for a product or service purchased by the payer at the participating store, the method including: transmitting a payment request signal that is requested to start a payment procedure to the terminal of the participating store, wherein the transmitting is performed by the auxiliary terminal; if the terminal of the participating store receives the payment request signal, extracting payment information from order details that are stored in advance for the product or serve purchased by the payer, wherein the extracting is performed by the terminal of the participating store; transmitting advertising data and the payment information to the auxiliary terminal, wherein the transmitting is performed by the terminal of the participating store; receiving the payment information and the advertising data from the terminal of the participating store, wherein the receiving is performed by the auxiliary terminal; if the auxiliary terminal is located within a distance at which the auxiliary terminal makes local area wireless communication with the mobile terminal of the payer, transmitting the payment information and the advertising data to the mobile terminal of the payer; if the mobile terminal of the payer receives the payment information, transmitting information about a payment means to pay the product or service purchased by the payer and the payment information to the payment processing system; outputting the advertising data, wherein the outputting is performed by the mobile terminal of the payer; if the payment processing system receives the information about the payment means and the payment information, transmitting information about a result of payment processing that indicates whether payment for the product or service purchased by the payer is finally processed based on the information about the payment means and the payment information, to the mobile terminal of the payer and the terminal of the participating store; and if the terminal of the participating store and the mobile terminal of the payer receive the information about the result of payment processing, outputting the information about the result of payment processing, wherein the payment information comprises a payment amount for the product or service purchased by the payer and participating store identification information of the participating store, and the advertising data is data associated with a location of the participating store or the product or service handled at the participating store, and personal information about the payer is not released to the participating store.

According to another aspect of the present invention, there is provided a computer readable recording medium having recorded thereon a program for executing the method.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The invention now will be described more fully hereinafter with reference to the accompanying drawings, in which exemplary embodiments of the invention are shown.

Figure 1:
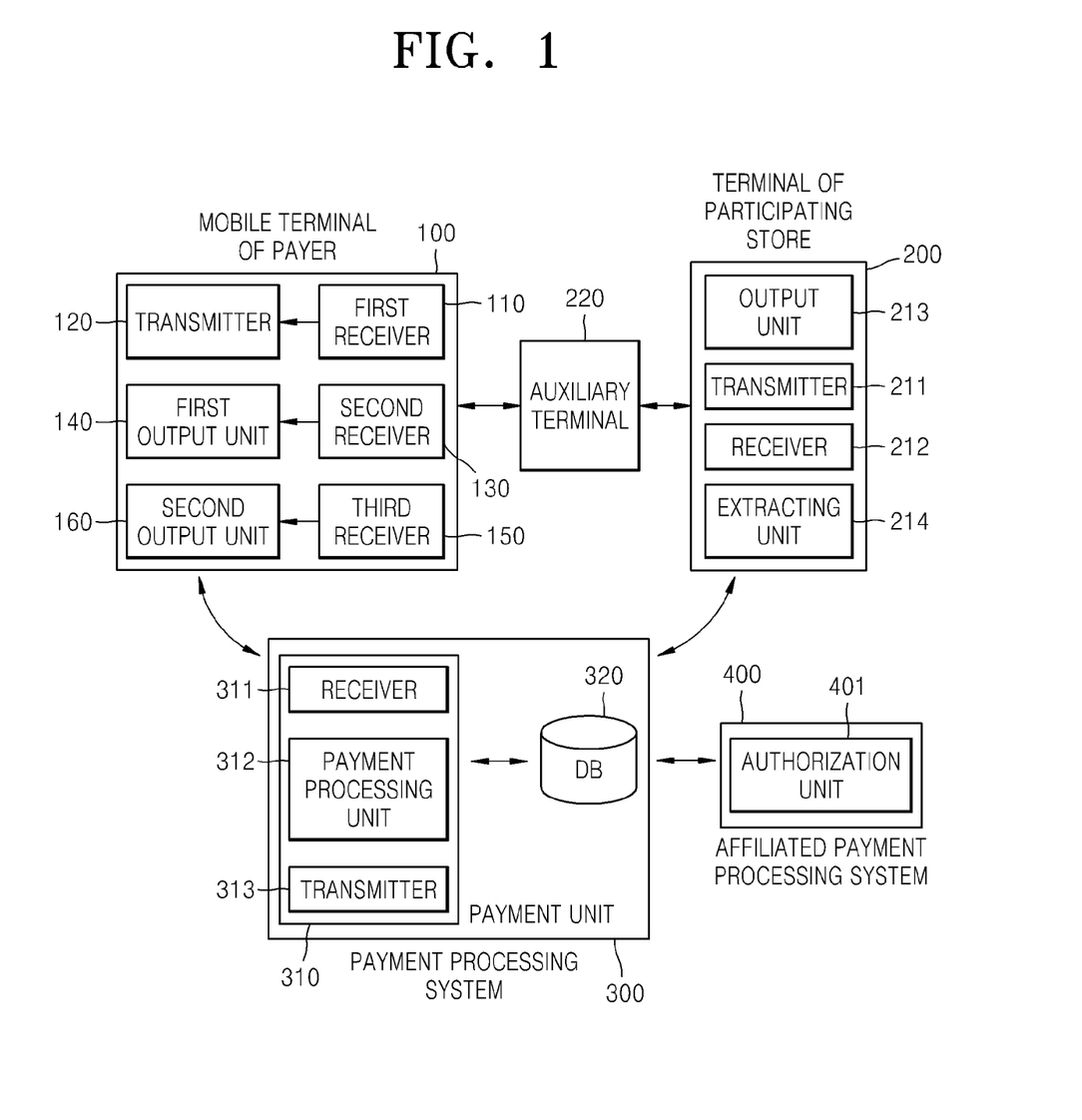
FIG. 1 is a block diagram of a payment system according to an embodiment of the present invention.
Figure 2:
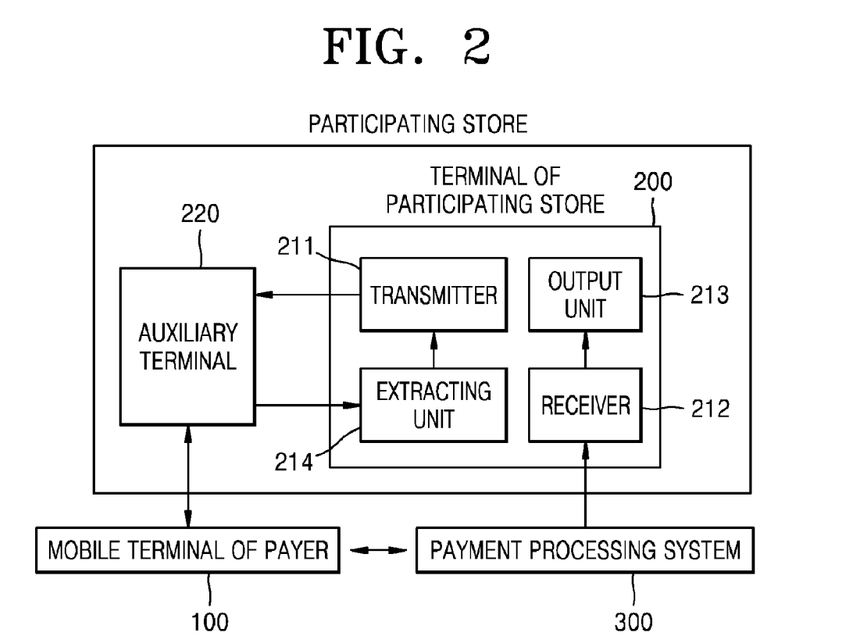
FIG. 2 is a block diagram of a participating store including an auxiliary terminal and a terminal of a participating store, according to an embodiment of the present invention.

FIG. 1 is a block diagram of a payment system according to an embodiment of the present invention, and FIG. 2 is a block diagram of a participating store including an auxiliary terminal and a terminal of a participating store, according to an embodiment of the present invention.

The payment system according to the current embodiment includes a mobile terminal 100 of a payer, a terminal 200 of a participating store, an auxiliary terminal 220, and a payment processing system 300.

The mobile terminal 100 of the payer is used for payer payment. Examples of the mobile terminal 100 of the payer may include a mobile phone, a personal communication serve (PCS) terminal, and a personal digital assistant (PDA), or the like.

The mobile terminal 100 of the payer includes a first receiver 110, a transmitter 120, a second receiver 130, a first output unit 140, a third receiver 150, and a second output unit 160.

The first receiver 110 receives payment information including a payment amount and participating store identification information from the auxiliary terminal 220. The payment amount is an amount which is required for a payer to purchase a product or service at a participating store and this amount must be paid to obtain the product or service.

The participating store identification information is identification information that is registered by the payment processing system 300 according to participating stores, so as to identify to whom an amount is to be paid by the payer when payment is made by using the payment processing system 300. The participating store identification information may be given to the participating store by the payment processing system 300 in advance and may be stored in a database 320 of the payment processing system 300.

The transmitter 120 transmits the payment information received by the first receiver 110 and information about a payment means to the payment processing system 300.

The payment means may be a credit card or check card of the payer, a gift certificate of which identification number can be input, or the like. Alternatively, when the payer drives a payment program in the mobile terminal 100 of the payer so that payment according to the present invention can be made and then selects the mobile terminal 100 of the payer as the payment means, the payment amount may be added to a future usage fee bill of the mobile terminal 100 of the payer, which will be sent to the payer at a later date.

The information about the payment means may be input by the payer in advance before the mobile terminal 100 of the payer receives the payment information from the auxiliary terminal 220 and may be stored in the mobile terminal 100 of the payer. The information about the payment means may also be input by the payer after the payment information has been received by the mobile terminal 100 of the payer. How to input the information about the payment means may be determined by a system designer in advance or may be selected discretionally by the payer.

The transmitter 120 may further transmit information about the payer that can be used to select advertising data, to the payment processing system 300. The information about the payer may be information about a payer's sex, age range, adult distinction, residential district, hobby, and special talent excluding the payer's citizen registration number or name through which the payer's identity may be revealed. The information about the payer is used to select advertising data by using the payment processing system 300 for target advertising.

The transmitter 120 may also transmit the information about the payer together with the payment information and the information about the payment means or may transmit the information about the payer to the payment processing system 300 in advance, separately from the payment information and the information about the payment means.

In addition, the transmitter 120 may transmit a payment request signal to the auxiliary terminal 220 that will be described later, by using local area wireless communication. The payment request signal is generated by driving the payment program embedded in the mobile terminal 100 of the payer. When the auxiliary terminal 220 is located within a range of local area wireless communication with the mobile terminal 100 of the payer, the payment request signal is transmitted to the auxiliary terminal 220 from the mobile terminal 100 of the payer by using local area wireless communication.

The second receiver 130 receives information about the result of payment processing by using the payment means from the payment processing system 300. The information about the result of payment processing is information that indicates whether payment has been successfully made by using the payment means. When payment has been successfully made by using the payment means, the information about the result of payment processing may indicate that payment has been successfully made.

When payment has failed, the information about the result of payment processing may indicate that payment has not been made. When payment has failed, the information about the result of payment processing may include failure reasons. The failure reasons may be exceeding of an upper limit of a credit card usage amount, wrong input of a credit card number or check card number, or the like.

The first output unit 140 outputs the information about the result of payment processing that has been received by the second receiver 130. The information about the result of payment processing may be output to a screen, may be output as voice or may be output both to a screen and as voice by using the mobile terminal 100 of the payer.

The third receiver 150 receives advertising data from the auxiliary terminal 220. The advertising data may be voice, text messages, moving picture or flash data. The advertising data may be used to inform the public of a participating store, a product or service handled at the participating store, a store located near the participating store, regional news or government news, or the like.

The advertising data may be received by the mobile terminal 100 of the payer together with or separately from the payment information.

The third receiver 150 may receive the advertising data from the payment processing system 300. The third receiver 150 may receive the advertising data in advance when the payment program is driven, and the transmitter 120 may receive the advertising data after transmitting the payment information and the information about the payment means to the payment processing system 300.

The second output unit 160 outputs the advertising data that has been received by the third receiver 150 before the first output unit 140 outputs the information about the result of payment processing. In other words, the second output unit 160 outputs the advertising data at a predetermined time that is set by the payer or the inventor of the present invention such as at time at which the payment information or the information about the payment means is transmitted to and received from the payment processing system 300.

When the second receiver 130 completes receipt of the information about the result of payment processing while the second output unit 160 outputs the advertising data, the second output unit 160 may stop output of the advertising data, and the first output unit 140 may output the information about the result of payment processing, and after output of the advertising data is completed, the first output unit 140 may output the information about the result of payment processing.

In this way, when the advertising data is output by the mobile terminal 100 of the payer before the information about the result of payment processing is output, the payer may wait for completion of payment while viewing advertising without being bored during payment processing. In addition, the participating store can perform public relation (PR) through advertising.

In the payment system according to the current embodiment, the mobile terminal 100 of the payer may be set on whether to output the advertising data. Settings on whether to output the advertising data may be performed by using the payment program. In this case, the second output unit 160 outputs the advertising data only when the mobile terminal 100 of the payer is set to output the advertising data.

The advertising data may be output by using an advertising output program stored in the mobile terminal 100 of the payer separately from the payment program. In this case, when the advertising output program is stored in the mobile terminal 100 of the payer, the second output unit 160 may recognize that the mobile terminal 100 of the payer is set to output the advertising data and may output the advertising data through the advertising output program.

In addition, even when the advertising output program is stored in the mobile terminal 100 of the payer, if the payment program or the advertising output program is set to not output advertising, the second output unit 160 may not output the advertising data.

The output advertising data may be output any time when the payer wants to see the advertising data again even after the advertising data is stored in the mobile terminal 100 of the payer and payment is completed. When a discount coupon about an object of advertising is included in the advertising data, the payer may use the discount coupon by re-outputting the advertising data.

The details of the outputting of the advertising data such as an output date of advertising may be stored in the mobile terminal 100 of the payer together with the payment amount, the information about the payment means, the participating store identification information, or the like.

When the advertising data is output during payment proceeding or after payment completion, the output date of the advertising data or data on whether to output the advertising data may be transmitted to the payment processing system 300 in real-time. The data may be used to accurately calculate an advertising cost by using the payment processing system 300.

In the structure of FIGS. 1 and 2, the terminal 200 of the participating store includes a transmitter 211, a receiver 212, an output unit 213, and an extracting unit 214.

The terminal 200 of the participating store is a fixed type terminal that is installed at the participating store and used to make payment at the participating store. The auxiliary terminal 220 is a mobile terminal that is used to make payment at the participating store, to exchange information with the terminal 200 of the participating store by using wireless communication and to exchange information with the mobile terminal 100 of the payer by using local area wireless communication.

According to another embodiment (not shown), a plurality of auxiliary terminals 220 may be connected to the terminal 200 of the participating store. In this case, the terminal 200 of the participating store may identify each of the plurality of auxiliary terminals 220.

The terminal 200 of the participating store may be located at a counter of the participating store. The auxiliary terminal 220 may be located close enough to the mobile terminal 100 of the payer and to the payer who holds the mobile terminal 100 of the payer to allow local area wireless communication with the mobile terminal 100 of the payer.

The auxiliary terminal 220 may be a portable terminal or a terminal embedded in the participating store. For example, the auxiliary terminal 220 may be a small-sized terminal installed at each of tables at a restaurant or a communication device such as a small-sized terminal or mobile phone that a home delivery restaurant deliveryman holds.

The auxiliary terminal 220 transmits an input payment request signal to the extracting unit 214 of the terminal of the participating store. The payment request signal is a signal that is requested to start a payment procedure so as to make payment at the participating store.

The payment request signal may be input manually by the payer, etc. For example, when a manual switch is disposed at the auxiliary terminal 220, the payer may operate the manual switch and may input the payment request signal to the auxiliary terminal 220. In addition, the auxiliary terminal 220 may receive the payment request signal from the mobile terminal 100 of the payer by using local area wireless communication.

The extracting unit 214 extracts the payment amount, in response to the payment request signal received by the auxiliary terminal 220 and transmits the extracted payment amount to the transmitter 211.

The terminal 200 of the participating store may store an order detail about a product or service for which the payer intends to pay, in advance. The extracting unit 214 extracts the payment amount from the previously-stored order detail.

When a plurality of order details are stored in the terminal 200 of the participating store in advance, the extracting unit 214 identifies from which auxiliary terminal 220 of the plurality of auxiliary terminals 220 the payment request signal is transmitted. After that, the extracting unit 214 may select order details corresponding to the auxiliary terminal 220 from which the payment request signal is transmitted and then may extract the payment amount from the order details.

The transmitter 211 transmits the payment amount extracted by the extracting unit 214 to the auxiliary terminal 220 which transmitted the payment request signal together with the participating store identification information, and the auxiliary terminal 220 transmits the payment amount and the participating store identification information to the mobile terminal 100 of the payer.

To this end, the transmitter 211 may transmit a payment information transmission signal that indicates to transmit the payment information including the payment amount extracted by the extracting unit 214 and the participating store identification information to the mobile terminal 100 of the payer, to the auxiliary terminal 220. The auxiliary terminal 220 transmits the payment information to the mobile terminal 100 of the payer by using local area wireless communication when the payment information transmission signal has been received.

In addition, the transmitter 211 may transmit the advertising data to the mobile terminal 100 of the payer by using the auxiliary terminal 220. To this end, the transmitter 211 transmits an advertising data transmission signal to the auxiliary terminal 220, the advertising data transmission signal indicating to transmit the advertising data to the mobile terminal 100 of the payer. The auxiliary terminal 220 transmits the advertising data to the mobile terminal 100 of the payer by using local area wireless communication when the advertising data transmission signal has been received.

The receiver 212 receives the information about the result of payment processing from the payment processing system 300. The information about the result of payment processing may be information on whether payment has been successfully made or has failed, as described previously.

In addition, the receiver 212 may receive the advertising data from the payment processing system 300. The advertising data may be received in advance before payment is made.

The transmitter 211 transmits the advertising data to the auxiliary terminal 220 when the receiver 212 receives the advertising data. The advertising data may be transmitted to the auxiliary terminal 220 together with the payment information, and the auxiliary terminal 220 finally transmits the advertising data to the mobile terminal 100 of the payer.

The output unit 213 outputs the information about the result of payment processing that has been received by the receiver 212. The information about the result of payment processing may be output to a screen, may be output as voice or may be output both to a screen and as voice by using the mobile terminal 100 of the payer.

In the example of FIG. 1, the payment processing system 300 performs authorization and processing of payment in connection with an affiliated payment processing system 400. For example, the payment processing system 300 may be a server of a payment agency.

The payment processing system 300 includes a payment unit 310 and a database 320, and the payment unit 310 includes a receiver 311, a payment processing unit 312, and a transmitter 313.

The receiver 311 receives the payment information and information about the payment means to pay the payment amount from the mobile terminal 100 of the payer.

The payment processing unit 312 allows the payment amount included in the payment information received by the receiver 311 at the participating store to be paid by the payment means. In other words, the payment processing unit 312 allows payment to be made by the payment means in connection with the affiliated payment processing system 400.

The payment processing unit 312 determines whether payment has been successfully made or has failed and transmits the information about the result of payment processing to the transmitter 313. The transmitter 313 transmits the information about the result of payment processing to the mobile terminal 100 of the payer, the terminal 200 of the participating store, and the auxiliary terminal 220.

The payment processing system 300 may manage the advertising that is provided by the mobile terminal 100 of the payer. As such, target advertising that is appropriate to a characteristic of the payer or participating store can be achieved by managing the advertising, and a portion of the advertising cost is given as a monetary benefit to the payer who has viewed the advertising.

The transmitter 313 transmits the advertising data to the mobile terminal 100 of the payer or the terminal 200 of the participating store. The advertising data may be transmitted during payment. When the advertising data has been received at the terminal 200 of the participating store during payment, the auxiliary terminal 220 transmits the advertising data to the mobile terminal 100 of the payer by using local area wireless communication.

When the advertising data has been received by the mobile terminal 100 of the payer from the payment processing system 300 or the auxiliary terminal 220 during payment, the mobile terminal 100 of the payer outputs the advertising data in real-time. Meanwhile, the advertising data may be transmitted by the transmitter 313 in advance before payment.

When the advertising data is transmitted by the mobile terminal 100 of the payer in advance, the mobile terminal 100 of the payer outputs the advertising data that has been received in advance during payment and is stored. When the advertising data is transmitted at the terminal 200 of the participating store in advance, the terminal 200 of the participating store transmits the advertising data that has been received in advance during payment, to the auxiliary terminal 220, and the auxiliary terminal 220 transmits the advertising data to the mobile terminal 100 of the payer so that the advertising data can be output to the mobile terminal 100 of the payer.

The receiver 311 receives information about the payer that can be used to select advertising data, from the mobile terminal 100 of the payer. The information about the payer is managed and stored in connection with a number of the mobile terminal 100 of the payer.

The payment processing system 300 selects the advertising data to be transmitted by the transmitter 313 by using one or more information of the information about the payer, information about the participating store identified by using the participating store identification information, and information about a payment day or time.

For example, when the participating store is identified by using the participating store identification information to be a liquor store that sells beer, the payment processing system 300 selects the advertising data to be about a new beer of a beer company. As another example, when the type of the participating store that identified by using the participating store identification information to be a liquor store and a payment time is determined by the payment processing system 300 to be a Friday evening, the payment processing system 300 selects advertising data about a drive-you-and-your-car-home service or a karaoke venue near the participating store.

As another example, when a residential area of the payer is written in the information about the payer, if it is determined that the location of the participating store stored in the database 320 in advance is within a predetermined distance from the residential area and a payment occurs during winter, the payment processing system 300 may select advertising data about a product or service for family such as Hoppahng (a kind of hot bread that Korean like to eat in Winter), instead of the drive-you-and-your-car-home service.

The database 320 corresponds to a general storage unit in which information is stored. The database 320 stores in advance information about a participating store including the location or type of the participating store, individual participating store identification information, a plurality of advertising data that is classified according to participating stores, and identification information about the terminal 200 of the participating store. In addition, the database 320 may store the information about the result of payment processing that is generated during payment processing.

The database 320 stores the information about the payer, the advertising data, and information about a classification criterion of the advertising data. The classification criterion of the advertising data includes information about age groups of advertising objects, a target area, a time zone for advertising, a product or service to be advertised, an advertising period, or the like.

The database 320 may store information about the number of times or date at which the transmitter 313 stores the advertising data to the terminal 200 of the participating store or the mobile terminal 100 of the payer or may store information on whether to output the advertising data that has been received by the receiver 311 from the mobile terminal 100 of the payer or an output date. The payment processing system 300 provides a portion of an advertising cost to the payer or the participating store by using the information during an advertising period or after the advertising period is terminated.

A monetary benefit for the participating store using a portion of the advertising cost may be realized through a reduction in charges or credit card charges generated when the payer uses the payment system according to the current embodiment or direct cash payment. The monetary benefit for the payer may be realized through a reduction in communication fees or various kinds of points, mileage, discount coupons, or the like.

The affiliated payment processing system 400 is a server of a company that enables payment using the payment means. For example, the affiliated payment processing system 400 may be a card company when the payment means is a credit card and may be a bank when the payment means is a check card.

The affiliated payment processing system 400 includes an authorization unit 401. The authorization unit 401 enables authorization of payment in connection with the payment processing system 300 so that money can be actually paid by using the payment means.

To this end, the payment processing system 300 starts communication with the affiliated payment processing system 400 corresponding to the payment means and transmits the payment information and information about the payment means to the affiliated payment processing system 400. The authorization unit 401 determines authorization of payment so that payment can be made and then transmits the result of payment processing to the payment processing system 300. This is well-known and thus, a more detailed description thereof will not be repeated.

As illustrated in FIGS. 1 and 2, even when the terminal 200 of the participating store is far away from the payer or the mobile terminal 100 of the payer, the payer may use a payment method according to the present invention conveniently by using local area wireless communication between the auxiliary terminal 220 and the mobile terminal 100 of the payer at the payer's home or at a table at which the payer is seated, without the need of going near the terminal 200 of the participating store.

According to another embodiment (not shown), the mobile terminal 100 of the payer may receive the payment information directly from the payer without receiving it from the terminal 200 of the participating store by using the first receiver 110.

For example, when a terminal that is used to make local area wireless communication is not displaced in the participating store or a local area wireless communication function is not available temporarily, if the payer comes to know the participating store identification number and the payment amount via a staff member of the participating store or by seeing a signboard of the participating store, the payer by himself/herself may input the payment information including the participating store identification number and the payment amount.

According to another embodiment (not shown), the payment information may include second identification information excluding the payment amount and the participating store identification number.

When a plurality of terminals 200 of the participating store or a plurality of auxiliary terminals 220 are disposed at one participating store, the second identification information may be unique identification information allocated to each of the terminals 200 of the participating store or each of the auxiliary terminals 220.

For example, it is assumed that a plurality of buses belonging to one bus company (participating store) and the terminal 200 of the participating store is installed at each of the buses. In this case, the bus company (participating store) may wish that the payment amount from the payer will be forwarded to the bus company.

Simultaneously, the bus company (participating store) may wish that the amount of bus fees that are paid for each of the buses will be calculated so as to determine whether each of the buses is well operated or to determine turnover details or trends according to bus service routes.

In this regard, the second identification information may be unique identification information allocated to each of the terminal 200 of the participating store or each of the auxiliary terminals 220 installed at each of the buses. The participating store identification number of the bus company (participating store) and the second identification number which is an identification number of the terminal 200 of the participating store or each of the auxiliary terminals 220 for respective buses are included in the payment information, and the payment information will be transmitted to the payment processing system 300 via the mobile terminal 100 of the payer from the terminal 200 of the participating store or each of the auxiliary terminals 220.

It is assumed that the information about whether payment has been successfully made or has failed is included in the information about the result of payment processing that is transmitted by the payment processing system 300. In addition, it is assumed that the payment processing system 300 transmits the information about the result of payment processing to the server or terminal of a head office of the bus company (participating store) by using the participating store identification number as well as to the terminal 200 of the participating store or each of the auxiliary terminals 220.

In this regard, the head office of the bus company may more easily manage the turnover details of each of the buses via the server of the head office automatically, and bus allocation for particular bus service routes or a change of the bus service routes may be determined based on the managed turnover details.

In addition, the second identification information may be an identification number allocated to a place or source of turnover when one terminal 200 of the participating store is disposed at one participating store but a plurality of places or sources of turnover exist in the participating store.

For example, when one terminal 200 of the participating store is disposed at one service store (participating store) but there are one or more clerks that provide services, the second identification number may be an identification number allocated to each of the clerks.

Under such circumstances, it is assumed that the second identification information is included in the payment information and the payment information is included in the information about the result of payment processing that is transmitted by the payment processing system 300 to the terminal 200 of the participating store. In this case, the service store (participating store) may unify a window of turnover based on external aspects and may perform actual results management with respect to employees and differential payment of salaries based on internal aspects.

Figure 3:
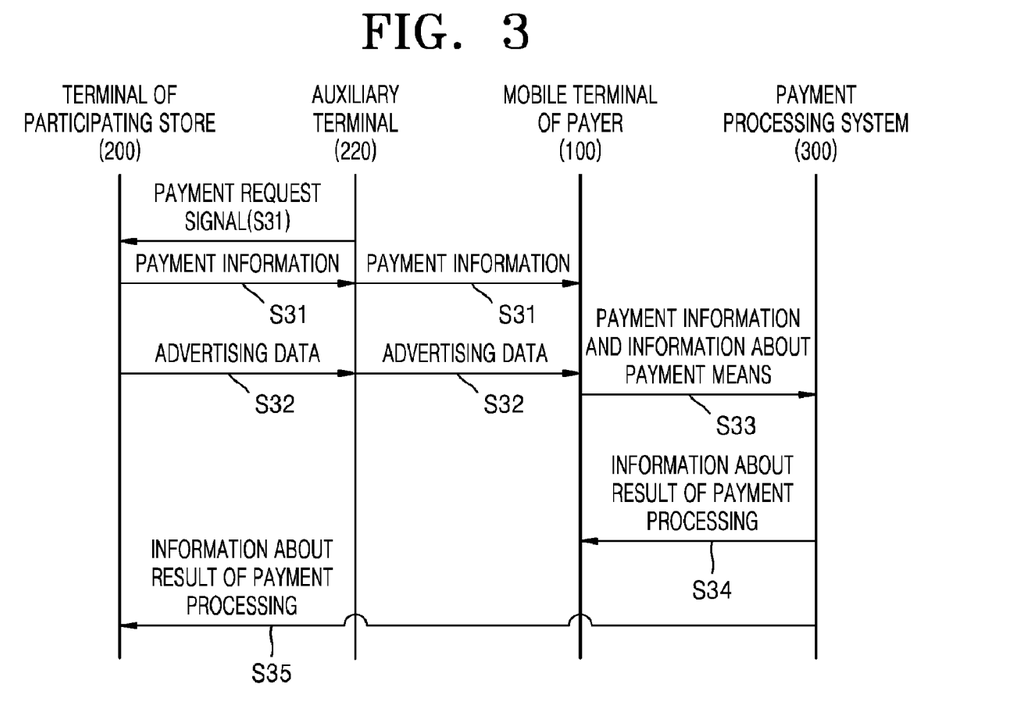
FIG. 3 is a flowchart illustrating a payment method according to an embodiment of the present invention.

FIG. 3 is a flowchart illustrating an electric signal that flows between the mobile terminal 100 of a payer, the terminal 200 of the participating store, the auxiliary terminal 220, and the payment processing system 300, according to an embodiment of the present invention.

The terminal 200 of the participating store receives a payment request signal from the auxiliary terminal 220 (S30).

The terminal 200 of the participating store that receives the payment request signal transmits the payment information including the payment amount and the participating store identification number to the auxiliary terminal 220, and the auxiliary terminal 220 transmits the received payment information to the mobile terminal 100 of the payer (S31).

The terminal 200 of the participating store transmits the advertising data to the auxiliary terminal 220 after transmitting the payment information, and the auxiliary terminal 220 transmits the advertising data to the mobile terminal 100 of the payer (S32).

The mobile terminal 100 of the payer transmits the information about the payment means and the payment information that has been received from the auxiliary terminal 220, to the payment processing system 300 (S33).

The payment processing system 300 transmits the information about the result of payment processing to the mobile terminal 100 of the payer after processing payment (S34) and then transmits the information about the result of payment processing to the terminal 200 of the participating store (S35). Meanwhile, the information about the result of payment processing may be transmitted directly to the auxiliary terminal 220 from the payment processing system 300 or may be transmitted to the auxiliary terminal 220 from the mobile terminal 100 of the payer or the terminal 200 of the participating store.

Figure 4:
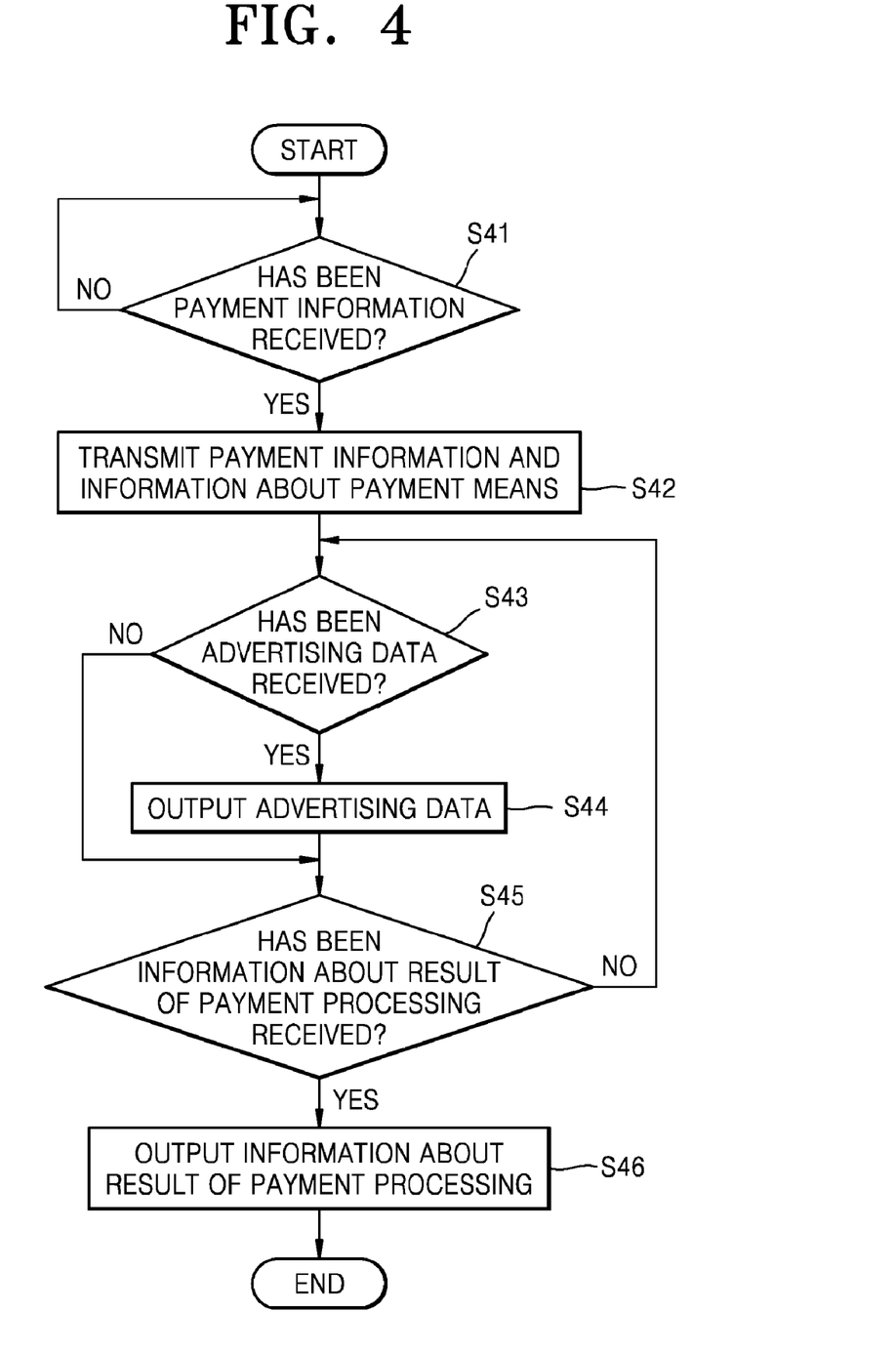
FIG. 4 is a flowchart illustrating a payment method by using a mobile terminal of a payer, according to another embodiment of the present invention.

FIG. 4 is a flowchart illustrating a payment method by using the mobile terminal 100 of the payer, according to an embodiment of the present invention.

In FIG. 4, it is assumed that communication and payment between the mobile terminal 100 of the payer and the auxiliary terminal 220 and the auxiliary terminal 220 and the terminal 200 of the participating store can be performed by making the mobile terminal 100 of the payer sufficiently close to the auxiliary terminal 220 or by driving the payment program embedded in the mobile terminal 100 of the payer so as to use the payment method according to the present invention.

The first receiver 110 determines whether the payment information including the payment amount and the participating store identification information has been received from the auxiliary terminal 220 (S41). The first receiver 110 waits when the payment information has not been received from the auxiliary terminal 220 and determines whether the payment information has been received from the auxiliary terminal 220.

The payment amount is an amount which is required for a payer to purchase a product or service at a participating store, and the payment amount must be paid for the product or service. The participating store identification information is identification information that is registered by the payment processing system 300 according to participating stores, so as to identify to whom an amount is to be paid by the payer when payment is made by using the payment processing system 300.

When the first receiver 110 receives the payment information, the transmitter 120 transmits the information about the payment means to pay the payment amount and the payment information to the payment processing system 300 (S42).

The information about the payment means may be input by the payer in advance before the mobile terminal 100 of the payer receives the payment information from the auxiliary terminal 220 and may be stored in the mobile terminal 100 of the payer. The information about the payment means may also be input by the payer after the payment information has been received by the mobile terminal 100 of the payer.

The third receiver 150 determines whether the advertising data has been received from the auxiliary terminal 220 (S43). When the third receiver 150 receives the advertising data, the second output unit 160 outputs the advertising data before the information about the result of payment processing is output (S44).

When the third receiver 150 does not receive the advertising data, the second output unit 160 does not output the advertising data, and the second receiver 130 determines whether the information about the result of payment processing has been received from the payment processing system 300 (S45).

When the second receiver 130 receives the information about the result of payment processing, the first output unit 140 outputs the information about the result of payment processing (S46). When the second receiver 130 does not receive the information about the result of payment processing, the second receiver 130 may determine whether the advertising data has been received by the third receiver 150.

The information about the result of payment processing is information that indicates whether payment has been successfully made or has failed by using the payment means. The first output unit 140 may output the information about the result of payment processing as an image or text messages to a screen, may output as voice or may output both to a screen and as voice by using the mobile terminal 100 of the payer.

Figure 5:
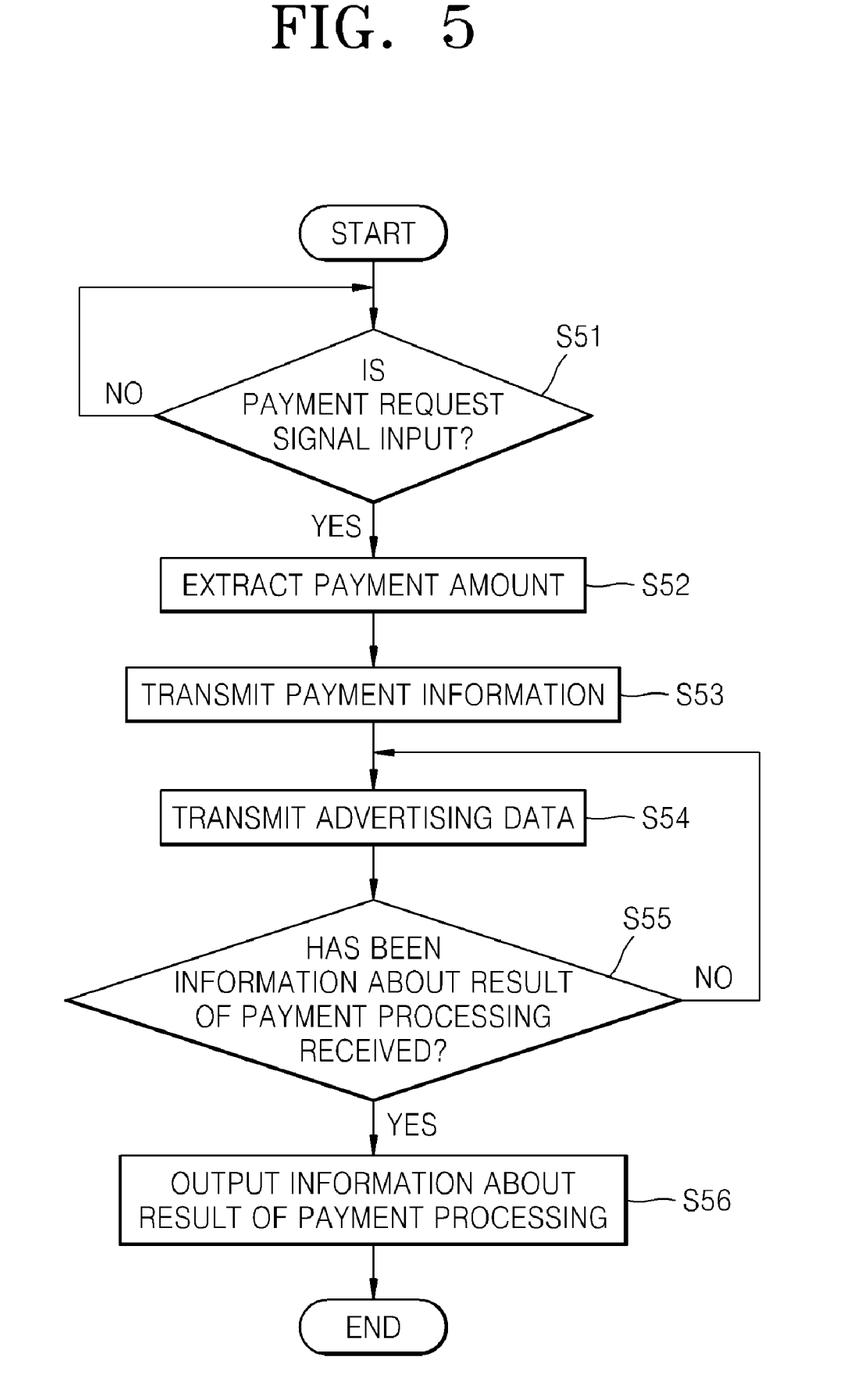
FIG. 5 is a flowchart illustrating a payment method by using a terminal of a participating store, according to an embodiment of the present invention.

FIG. 5 is a flowchart illustrating a payment method by using the terminal 200 of the participating store and the auxiliary terminal 220, according to an embodiment of the present invention.

The auxiliary terminal 220 determines whether the payment request signal that is requested to start a payment procedure so as to make payment at the participating store is input (S51). When the payment request signal is not input to the auxiliary terminal 220, the auxiliary terminal 220 waits for input of the payment request signal from the payer.

When a button is disposed in the auxiliary terminal 220, the payment request signal may be input by pressing the button. In addition, the payment request signal that is generated by driving the payment program embedded in the mobile terminal 100 of the payer may be transmitted to the auxiliary terminal 220 that is located within a predetermined distance from the mobile terminal 100 of the payer.

When the auxiliary terminal 220 receives the payment request signal, the extracting unit 214 of the terminal 200 of the participating store extracts the payment amount that is paid from a payer's order detail stored in the terminal 200 of the participating store in response to the payment request signal received from the auxiliary terminal 220 (S52).

The transmitter 211 transmits the payment information including the payment amount extracted by the extracting unit 214 and the participating store identification information to the auxiliary terminal 220, and the auxiliary terminal 220 transmits the payment information to the mobile terminal 100 of the payer (S53). In addition, the transmitter 211 transmits the advertising data stored in the terminal 200 of the participating store to the mobile terminal 100 of the payer via the auxiliary terminal 220 (S54).

The advertising data may be transmitted in real-time from the payment processing system 300 during payment and may be stored or may be transmitted from the payment processing system 300 in advance before payment starts.

The receiver 212 determines whether the information about the result of payment processing from the payment processing system 300 (S55).

When the receiver 212 receives the information about the result of payment processing from the payment processing system 300, the output unit 213 outputs the received information about the result of payment processing (S56).

When the receiver 212 does not receive the information about the result of payment processing from the payment processing system 300, the receiver 212 allows the transmitter 211 to transmit the advertising data to the mobile terminal 100 of the payer via the auxiliary terminal 220 (S54). In this case, the transmitted advertising data may be the same as or different from the initially-transmitted advertising data.

Figure 6:
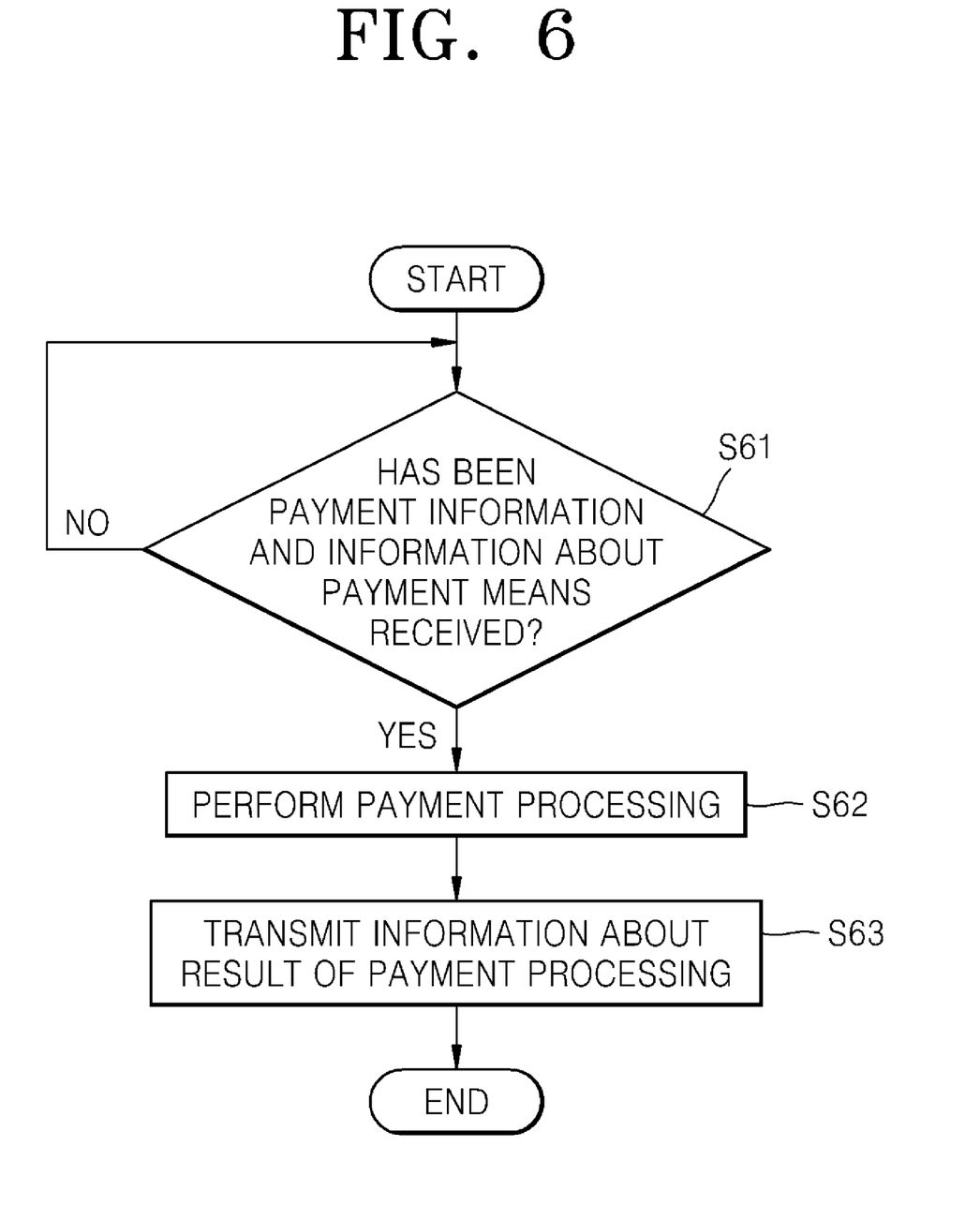
FIG. 6 is a flowchart illustrating a payment method by using a payment processing system, according to an embodiment of the present invention.

FIG. 6 is a flowchart illustrating a payment method by using the payment processing system 300, according to an embodiment of the present invention.

The receiver 311 determines whether the payment information and the information about the payment means to pay the payment amount has been received from the mobile terminal 100 of the payer (S61). Here, the payment information is information including the payment amount and the participating store identification information, which is finally transmitted to the payment processing system 300 from the terminal 200 of the participating store via the auxiliary terminal 220 and the mobile terminal 100 of the payer.

When the receiver 311 does not receive the payment information and the information about the payment means, the receiver 311 waits until the payment information and the information about the payment means are received.

When the receiver 311 receives the payment information and the information about the payment means, the payment processing unit 312 performs payment processing so that the payment amount can be paid by the payment means at the participating store (S62).

The transmitter 313 transmits the information about the result of payment processing by using the payment means to the mobile terminal 100 of the payer and the terminal 200 of the participating store or the auxiliary terminal 220 (S63).

Figure 7:
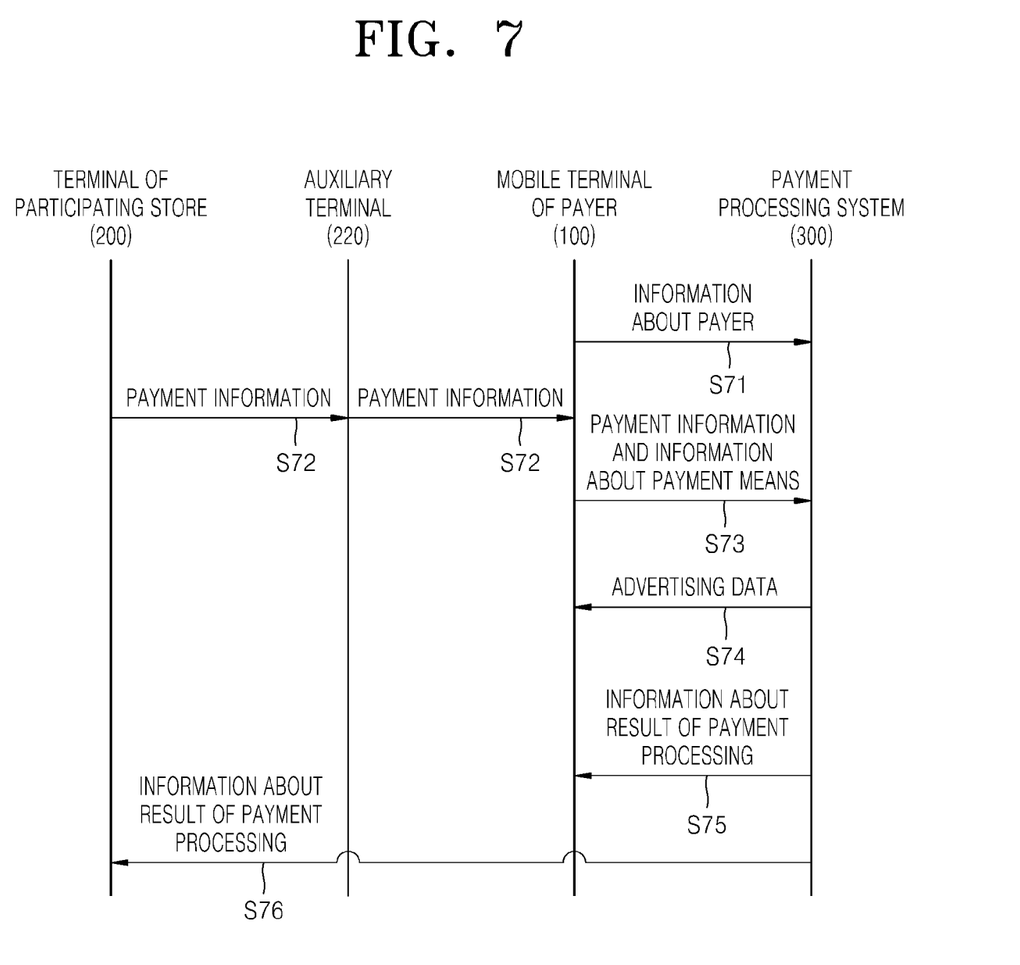
FIG. 7 is a flowchart illustrating a payment method according to another embodiment of the present invention.

FIG. 7 is a flowchart illustrating a payment method according to another embodiment of the present invention.

The mobile terminal 100 of the payer transmits the information about the payer to the payment processing system 300 (S71). The information about the payer may be information about a payer's sex, age range, residential district, hobby, and special talent excluding a payer's citizen registration number or name through which the payer's identity may be revealed.

The terminal 200 of the participating store transmits the payment information including the payment amount and the participating store identification information to the auxiliary terminal 220, and the auxiliary terminal 220 transmits the payment information to the mobile terminal 100 of the payer (S72). The mobile terminal 100 of the payer transmits the information about the payment means and the received payment information to the payment processing system 300 (S73).

The payment processing system 300 transmits the advertising data that is selected by the using the information about the payer and the participating store identification information, to the mobile terminal 100 of the payer (S74). Meanwhile, the selected advertising data is transmitted to the terminal 200 of the participating store and then may be transmitted to the mobile terminal 100 of the payer from the terminal 200 of the participating store via the auxiliary terminal 220.

The payment processing system 300 performs payment processing and transmits the information about the result of payment processing to the mobile terminal 100 of the payer (S75) and transmits the result of payment processing to the terminal 200 of the participating store and/or the auxiliary terminal 220 (S76).

Figure 8:
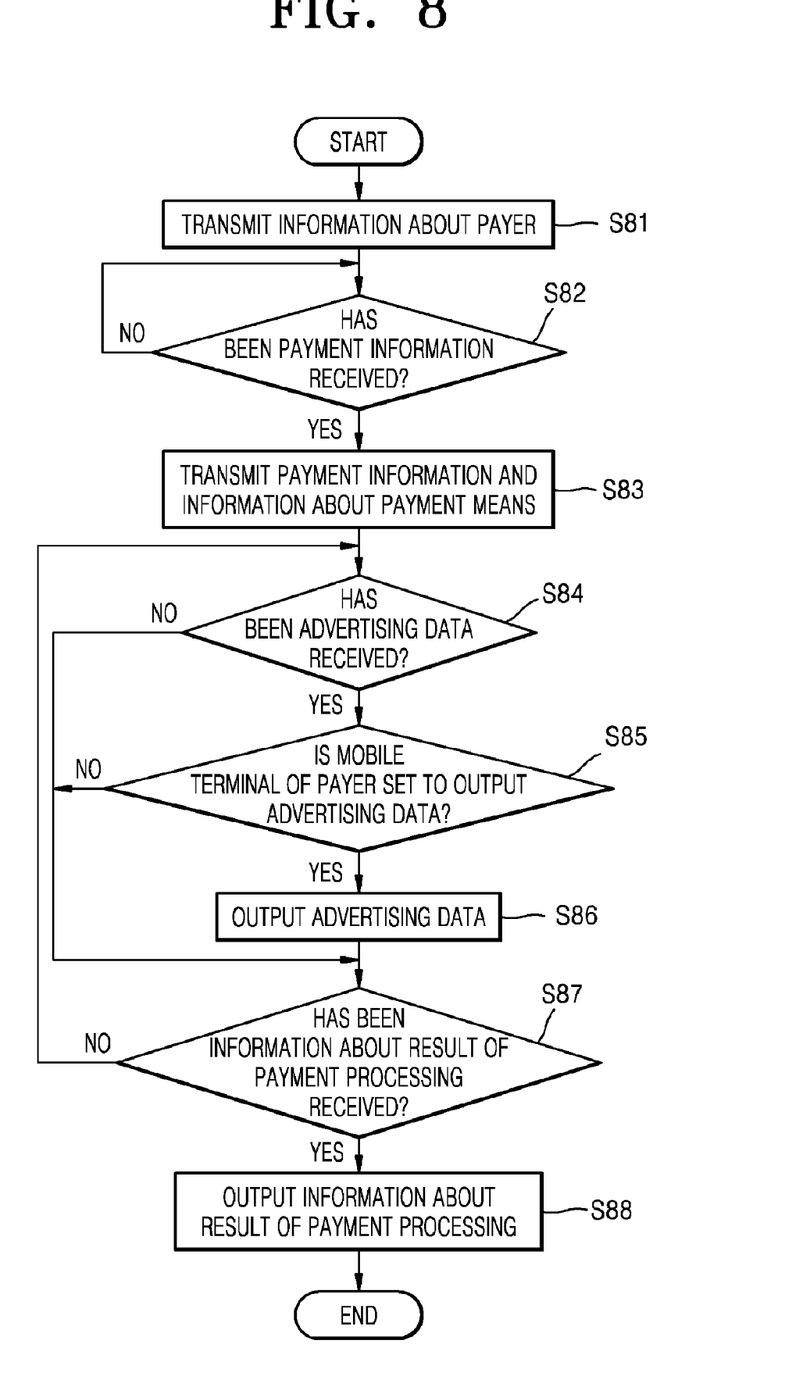
FIG. 8 is a flowchart illustrating a payment method by using a mobile terminal of a payer, according to another embodiment of the present invention.

FIG. 8 is a flowchart illustrating a payment method using the mobile terminal 100 of the payer, according to another embodiment of the present invention.

The transmitter 120 transmits the information about the payer that can be used to select advertising data, to the payment processing system 300 in advance (S81). The first receiver 110 determines whether it receives the payment information including the payment amount and the participating store identification information from the terminal 200 of the participating store (S82).

When the payment information is not received, the first receiver 110 waits and determines whether it receives the payment information from the terminal 200 of the participating store. When the first receiver 110 receives the payment information, the transmitter 120 transmits the information about the payment means to pay the payment amount and the payment information to the payment processing system 300 (S83).

The third receiver 150 determines whether the advertising data has been received from the auxiliary terminal 220 or the payment processing system 300 (S84). When the third receiver 150 receives the advertising data, the second output unit 160 determines whether the mobile terminal 100 of the payer is set to output the advertising data (S85).

When the mobile terminal 100 of the payer is set to output the advertising data, the second output unit 160 outputs the advertising data before the information about the result of payment processing is output (S86), and the second receiver 130 determines whether the information about the result of payment processing has been received from the payment processing system 300 (S87).

When the third receiver 150 does not receive the advertising data or the mobile terminal 100 of the payer is not set to output the advertising data, the second output unit 160 does not output the advertising data, and the second receiver 130 determines whether the information about the result of payment processing has been received from the payment processing system 300 (S87).

When the second receiver 130 receives the information about the result of payment processing, the first output unit 140 outputs the information about the result of payment processing (S88). When the second receiver 130 does not receive the information about the result of payment processing, the second receiver 130 may allow the third receiver 150 to determine whether it receives the advertising data.

Figure 9:
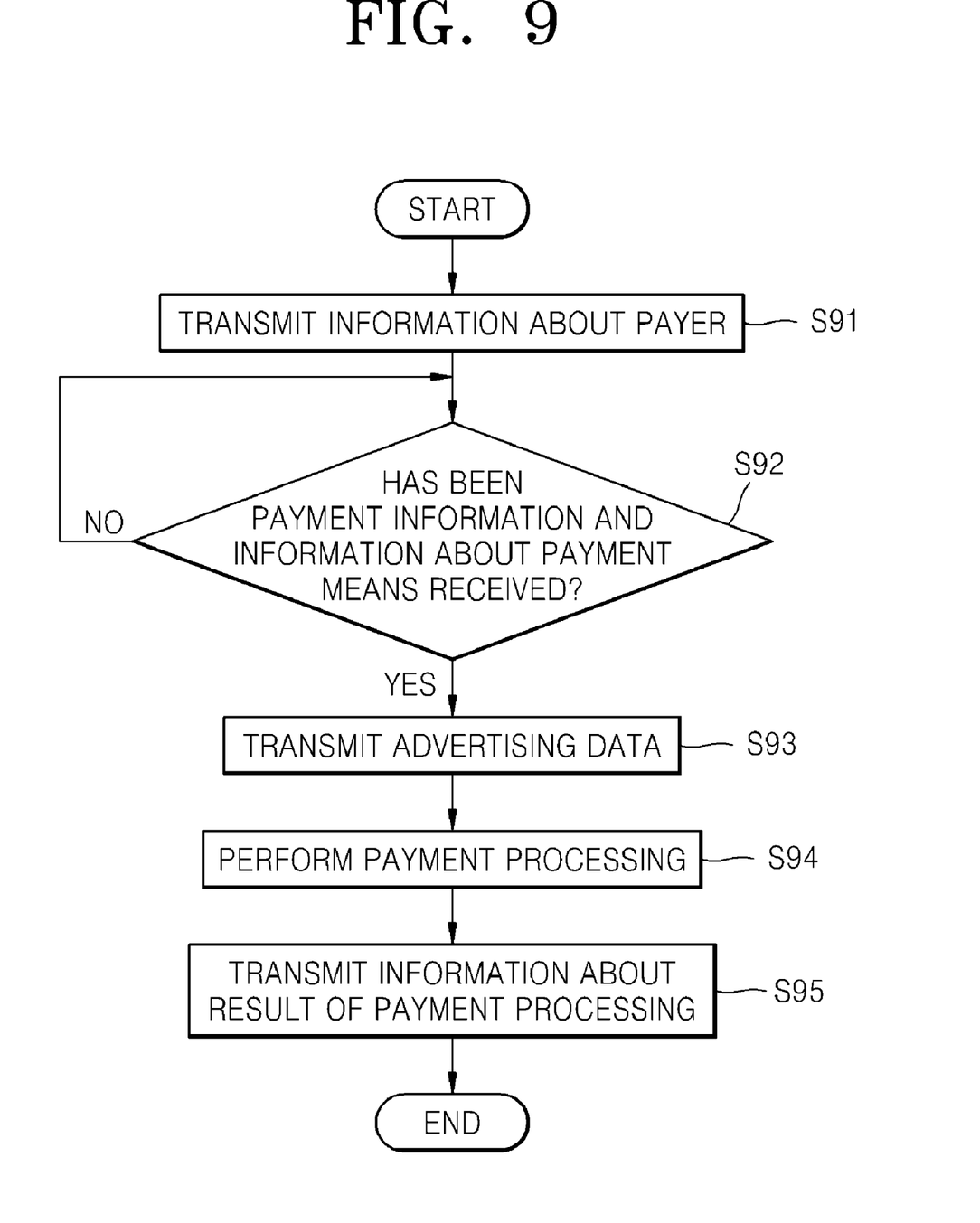
FIG. 9 is a flowchart illustrating a payment method by using a payment processing system, according to another embodiment of the present invention.

FIG. 9 is a flowchart illustrating a payment method by using the payment processing system 300, according to another embodiment of the present invention.

The receiver 311 receives the information about the payer from the mobile terminal 100 of the payer in advance (S91). The received information about the payer may be stored in the database 320.

The receiver 311 determines whether the payment information and the information about the payment means from the mobile terminal 100 of the payer (S92). The payment information includes the payment amount and the participating store identification information and is transmitted to the mobile terminal 100 of the payer via the auxiliary terminal 220 from the terminal 200 of the participating store.

If the receiver 311 has not received the payment information and the information about the payment means, the receiver 311 waits until it receives the payment information and the information about the payment means.

When the receiver 311 receives the payment information and the information about the payment means, the transmitter 313 transmits the advertising data that is selected by using the participating store identification information and the information about the payer, to the mobile terminal 100 of the payer or the terminal 200 of the participating store (S93). When the advertising data is transmitted to the terminal 200 of the participating store, the terminal 200 of the participating store may transmit the advertising data to the auxiliary terminal 220, and the auxiliary terminal 220 may finally transmit the advertising data to the mobile terminal 100 of the payer.

After that, the payment processing unit 312 performs payment processing so that the payment amount can be paid by the payment means at the participating store (S94), and the transmitter 313 transmits the information about the result of payment processing by the payment means to the mobile terminal 100 of the payer and the terminal 200 of the participating store (S95). Meanwhile, the information about the result of payment processing may also be transmitted to the auxiliary terminal 220.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

As described above, according to the present invention, personal information about a payer is not provided to a participating store and payment is made such that the payer can make payment safely without worrying about the release of personal information or fraudulent use of a credit card and the probability of related crimes can be reduced.

In addition, payment is made by using at least one of mobile auxiliary terminals connected to a terminal of a participating store through wireless communication such that the payer can make payment without temporal and spatial limitations.

In addition, efficient target advertising using information about the participating store and the payer is provided to the payer, and an advertising effect is enhanced, and a portion of an advertising cost may be given as a monetary benefit to the payer who has viewed the advertising such that both advertiser and payer satisfaction can be improved.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A system for payer-centric payment using a mobile terminal, the system comprising:
   a terminal of a participating store installed at the participating store;
   an auxiliary terminal that is mobile and is connected to the terminal of the participating store by using wireless communication;
   a mobile terminal of a payer connected to the auxiliary terminal by using local area wireless communication; and a payment processing system for making payment for a product or service being purchased by the payer at the participating store, wherein:
the payment processing system transmits advertising data to the terminal of the participating store, the advertising data comprising data associated with a location of the participating store or a product or service handled at the participating store;
the terminal of the participating store receives the advertising data from the payment processing system;
the auxiliary terminal transmits a payment request signal requesting to start a payment procedure to the terminal of the participating store;
the terminal of the participating store receives the payment request signal;
the terminal of the participating store extracts payment information from an order detail that is stored in advance for the product or service being purchased by the payer, the payment information comprising a payment amount for the product or service being purchased by the payer and participating store identification information of the participating store;
the terminal of the participating store transmits the advertising data and the payment information to the auxiliary terminal that transmitted the payment request signal;
the auxiliary terminal transmits the payment information and the advertising data received from the terminal of the participating store to the mobile terminal of the payer by using local area wireless communication;
the mobile terminal of the payer receives the payment information and the advertising data from the auxiliary terminal;
the mobile terminal of the payer transmits information about a payment method to the payment processing system together with the payment information received from the auxiliary terminal;
the mobile terminal of the payer outputs the advertising data received from the auxiliary terminal;
the payment processing system finally makes payment for the product or service being purchased by the payer based on the payment information and the information about the payment method received from the mobile terminal of the payer;
the payment processing system transmits the information about the result of payment processing to the mobile terminal of the payer and to the terminal of the participating store, the information about the result of payment processing indicating whether payment for the product or service being purchased by the payer is finally processed;
the mobile terminal of the payer receives the information about the result of payment processing from the payment processing system;
the mobile terminal of the payer outputs the information about the result of payment processing;
the terminal of the participating store receives, from the payment processing system, information about a result of payment processing that indicates whether payment for the product or service being purchased by the payer is finally processed;
the terminal of the participating store outputs the information about the result of payment processing;
and wherein personal information about the payer is not revealed to the participating store.

2. The system of claim 1, wherein the terminal of the participating store comprises:
an extracting unit extracting the payment information from order details that are stored in advance for the product or service purchased by the payer when the terminal of the participating store receives the payment request signal from the auxiliary terminal;
a receiver receiving the information about the result of payment processing and the advertising data from the payment processing system;
a transmitter transmitting the payment information and the advertising data to the auxiliary terminal; and
an output unit outputting the information about the result of payment processing.

3. The system of claim 1, wherein the mobile terminal of the payer comprises:
a first receiver receiving the payment information from the auxiliary terminal;
a transmitter transmitting the information about the payment method and the payment information to the payment processing system;
a second receiver receiving the information about the result of payment processing from the payment processing system;
a third receiver receiving the advertising data from the auxiliary terminal;
a first output unit outputting the information about the result of payment processing; and
a second output unit outputting the advertising data.

4. The system of claim 3, wherein the second output unit outputs the advertising data before the information about the result of payment processing is output by the first output unit.

5. The system of claim 1, wherein the payment processing system comprises:
a receiver receiving the payment information and the information about the payment method from the mobile terminal of the payer;
a payment processing unit making payment for the product or service purchased by the payer according to the information about the payment method and generating the information about the result of payment processing that indicates whether payment for the product or service purchased by the payer is finally processed; and
a transmitter transmitting the information about the result of payment processing to the terminal of the participating store and the mobile terminal of the payer and transmitting the advertising data to the terminal of the participating store.

6. The system of claim 1, wherein the payment request signal is a signal that is generated by driving a payment program embedded in the mobile terminal of the payer and is transmitted to the auxiliary terminal from the mobile terminal of the payer by using local area wireless communication when the mobile terminal of the payer is located within a range of local area wireless communication of the auxiliary terminal.

7. The system of claim 5, wherein the payment processing system further comprises a database storing in advance information about a participating store including a location or type of the participating store, individual participating store identification information, and a plurality of pieces of advertising data that are classified according to participating stores, and the advertising data is selected from the database according to the individual participating store identification information and is transmitted to the terminal of the participating store from the payment processing system.

8. The system of claim 7, wherein the mobile terminal of the payer transmits data about an output date of the advertising data or data on whether to output the advertising data to the payment processing system, and the database further stores the data about an output date of the advertising data or the data on whether to output the advertising data, and the payment processing system accurately calculates an advertising cost by using the data about an output date of the advertising data or the data on whether to output the advertising data stored in the database.

9. A method of payer-centric payment using a mobile terminal by using a payer-centric system comprising a terminal of a participating store installed at the participating store, an auxiliary terminal that is mobile and is connected to the terminal of the participating store by using wireless communication, a mobile terminal of a payer connected to the auxiliary terminal by using local area wireless communication, and a payment processing system making payment for a product or service being purchased by the payer at the participating store, the method comprising:

transmitting advertising data from the payment processing system to the terminal of the participating store, the advertising data comprising data associated with a location of the participating store or a product or service handled at the participating store;

transmitting, from the auxiliary terminal to the terminal of the participating store, a payment request signal requesting to start a payment procedure;

extracting, by the terminal of the participating store, payment information from an order detail that is stored in advance for the product or service being purchased by the payer, the payment information comprising a payment amount for the product or service being purchased by the payer and participating store identification information of the participating store;

transmitting, from the terminal of the participating store to the auxiliary terminal that transmitted the payment request signal, the advertising data and the payment information;

transmitting, from the auxiliary terminal to the mobile terminal of the payer by using local area wireless communication, the payment information and the advertising data received from the terminal of the participating store;

transmitting, from the mobile terminal of the payer to the payment processing system, information about a payment method together with the payment information received from the auxiliary terminal;

outputting, by the mobile terminal of the payer, the advertising data received from the auxiliary terminal;

finally making payment, by the payment processing system, for the product or service being purchased by the payer based on the payment information and the information about the payment method received from the mobile terminal of the payer;

transmitting, from the payment processing system to both the mobile terminal of the payer and the terminal of the participating store, the information about the result of payment processing, the information about the result of payment processing indicating whether payment for the product or service being purchased by the payer is finally processed;

outputting, by the mobile terminal of the payer, the information about the result of payment processing; and     outputting, by the terminal of the participating store, the information about the result of payment processing;

wherein personal information about the payer is not revealed to the participating store.

10. The method of claim 9, wherein the transmitting of the payment request signal to the terminal of the participating store comprises:

generating the payment request signal by driving a payment program which is embedded on the mobile terminal of the payer     if the mobile terminal of the payer is located within a range of local area wireless communication of the auxiliary terminal, transmitting the payment request signal to the auxiliary terminal by using local area wireless communication, wherein the transmitting is performed by the mobile terminal of the payer; and     if the auxiliary terminal receives the payment request signal, transmitting the payment request signal that has been received by using wireless communication, to the terminal of the participating store.

11. The method of claim 9, wherein the advertising data in the outputting of the advertising data is output before the mobile terminal of the payer outputs the information about the result of payment processing.

12. The method of claim 9, wherein the payment processing system comprises a database storing in advance information about a participating store including a location or type of the participating store, individual participating store identification information, and a plurality of pieces of advertising data that are classified according to participating stores, and the advertising data is selected from the database according to the individual participating store identification information and is transmitted to the terminal of the participating store from the payment processing system.

13. The method of claim 9, further comprising:

transmitting data about an output date of the advertising data or data on whether to output the advertising data to the payment processing system, wherein the transmitting is performed by the mobile terminal of the payer; and     accurately calculating an advertising cost by using the data about an output date of the advertising data or the data on whether to output the advertising data, wherein the accurately calculating is performed by the payment processing system.

14. A non-transitory computer-readable medium having recorded thereon computer-readable instructions, which when executed by at least one computer processor, perform a method of payer-centric payment using a mobile terminal by using a payer-centric system comprising a terminal of a participating store installed at the participating store, an auxiliary terminal that is mobile and is connected to the terminal of the participating store by using wireless communication, a mobile terminal of a payer connected to the auxiliary terminal by using local area wireless communication, and a payment processing system making payment for a product or service being purchased by the payer at the participating store, the method comprising:

transmitting advertising data from the payment processing system to the terminal of the participating store, the advertising data comprising data associated with a location of the participating store or a product or service handled at the participating store;

transmitting, from the auxiliary terminal to the terminal of the participating store, a payment request signal requesting to start a payment procedure;

extracting, by the terminal of the participating store, payment information from an order detail that is stored in advance for the product or service being purchased by the payer, the payment information comprising a payment amount for the product or service being purchased by the payer and participating store identification information of the participating store;

transmitting, from the terminal of the participating store to the auxiliary terminal that transmitted the payment request signal, the advertising data and the payment information;

transmitting, from the auxiliary terminal to the mobile terminal of the payer by using local area wireless communication, the payment information and the advertising data received from the terminal of the participating store;

transmitting, from the mobile terminal of the payer to the payment processing system, information about a payment method together with the payment information received from the auxiliary terminal;

outputting, by the mobile terminal of the payer, the advertising data received from the auxiliary terminal;

finally making payment, by the payment processing system, for the product or service being purchased by the payer based on the payment information and the information about the payment method received from the mobile terminal of the payer;

transmitting, from the payment processing system to both the mobile terminal of the payer and the terminal of the participating store, the information about the result of payment processing, the information about the result of payment processing indicating whether payment for the product or service being purchased by the payer is finally processed;

outputting, by the mobile terminal of the payer, the information about the result of payment processing; and outputting, by the terminal of the participating store, the information about the result of payment processing;

wherein personal information about the payer is not revealed to the participating store.

* * * * *